Nov. 20, 1962   C. R. CANALIZO ETAL   3,064,628
GAS POWERED TIMER
Filed May 18, 1959
4 Sheets-Sheet 1
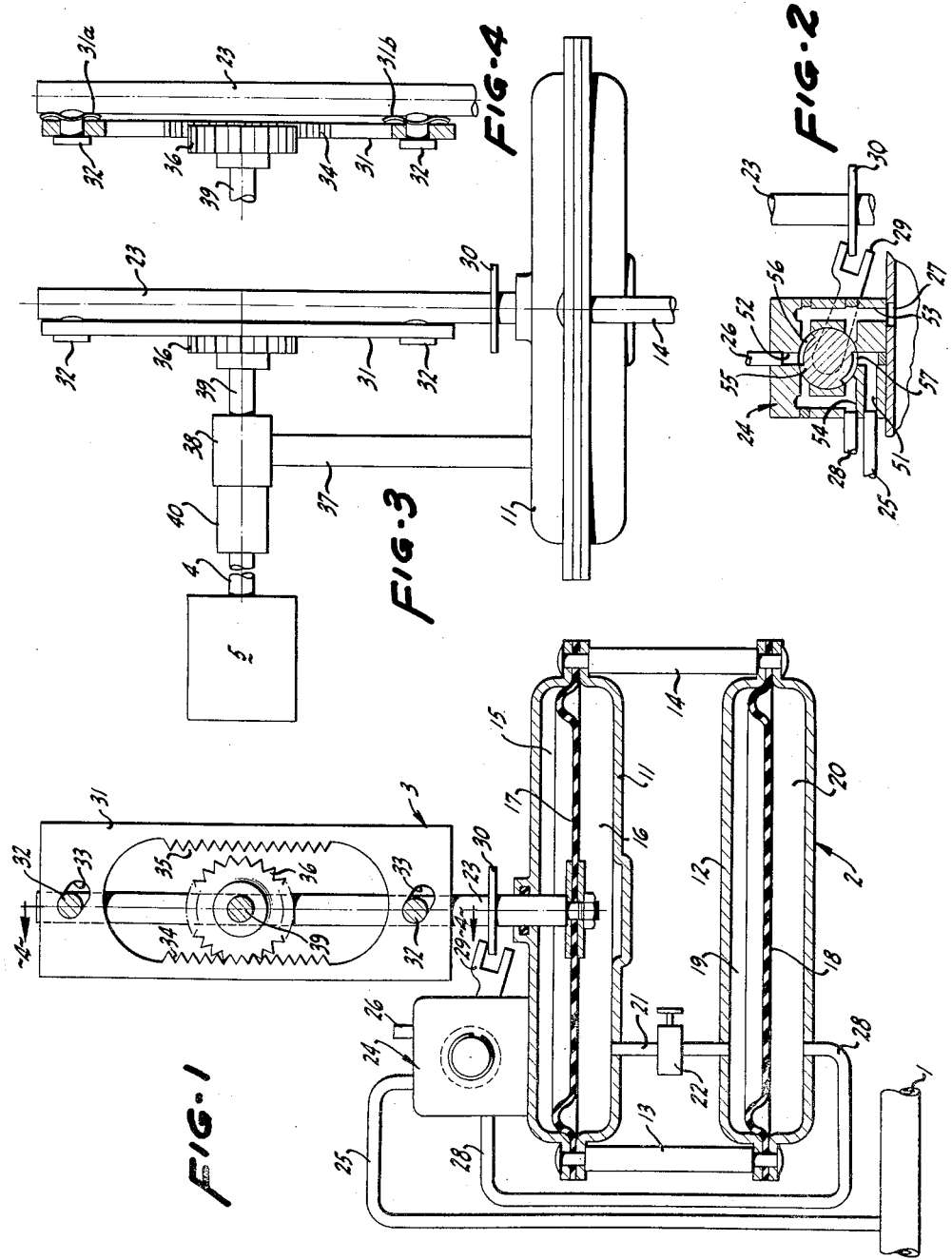
INVENTORS
CARLOS R. CANALIZO
SHELBY J. GRAVES
BY
Mellin and Hanscom
ATTORNEYS Nov. 20, 1962   C. R. CANALIZO ETAL   3,064,628
GAS POWERED TIMER
Filed May 18, 1959   4 Sheets-Sheet 2
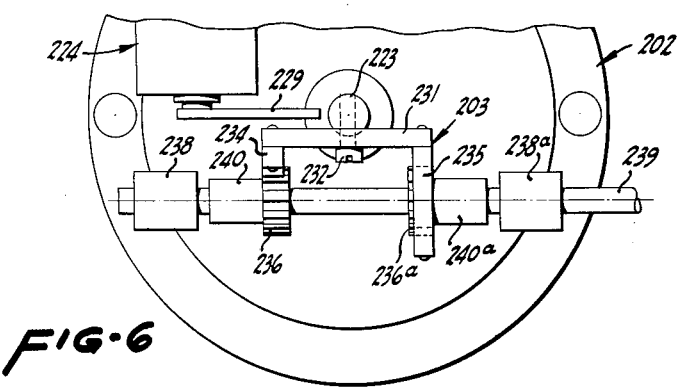
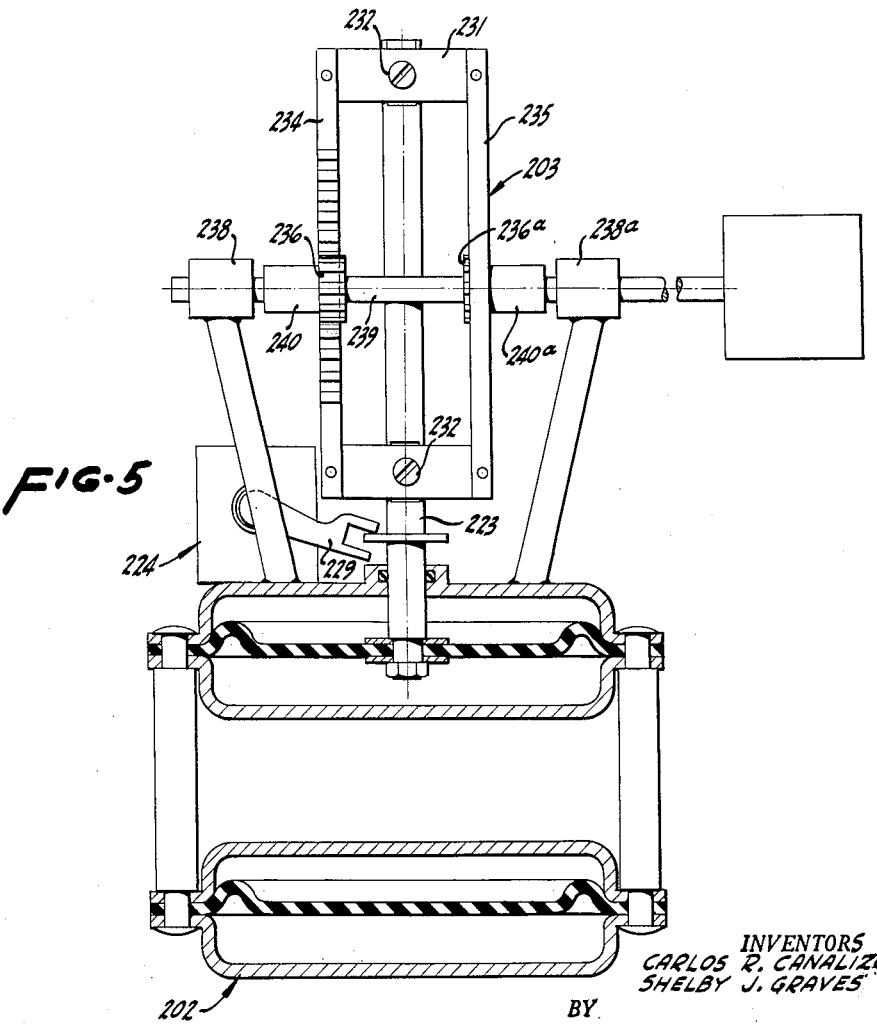
INVENTORS
CARLOS R. CANALIZO
SHELBY J. GRAVES
BY
Mellin and Hanscom
ATTORNEYS

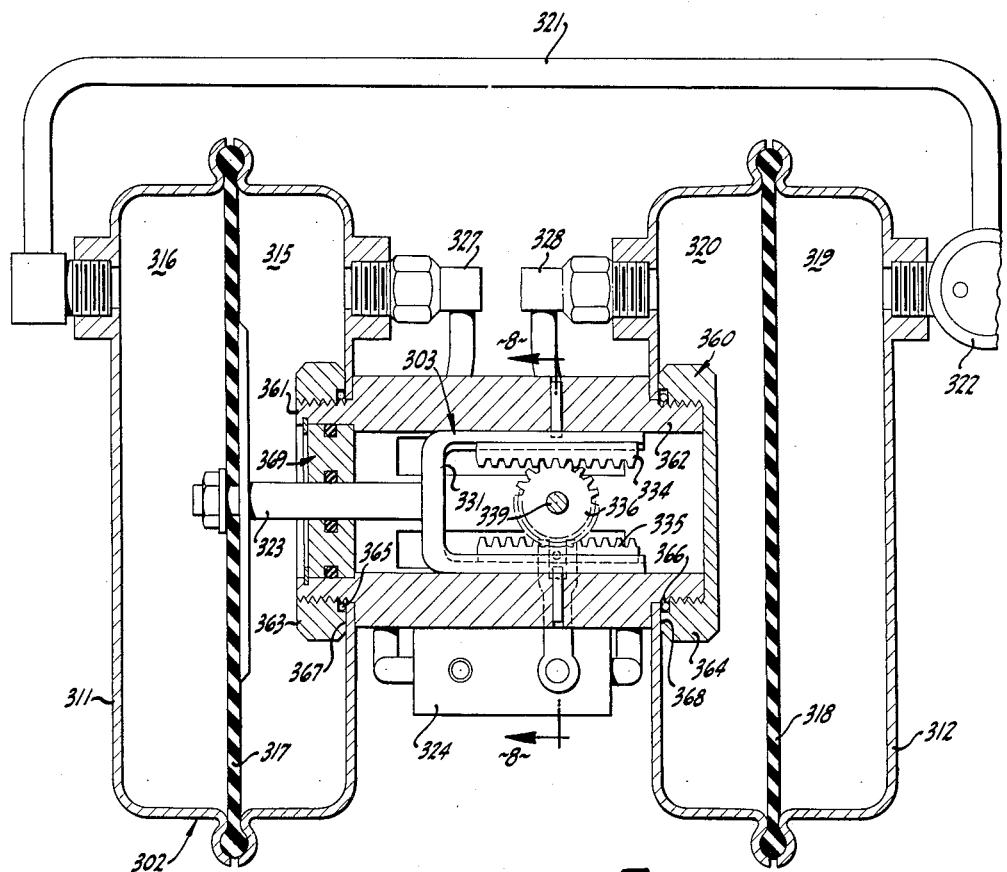
FIG. 7
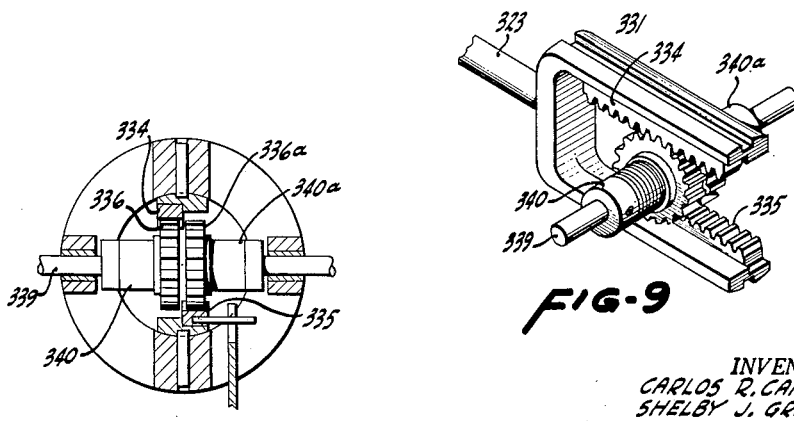
FIG. 8
FIG. 9
INVENTORS
CARLOS R. CANALIZO
SHELBY J. GRAVES
BY
Mellin and Hanscom
ATTORNEYS United States Patent Office 3,064,628
Patented Nov. 20, 1962

3,064,628
GAS POWERED TIMER
Carlos R. Canalizo and Shelby J. Graves, Dallas, Tex., assignors, by mesne assignments, to Otis Engineering Corporation, Dallas County, Tex., a corporation of Texas
Filed May 18, 1959, Ser. No. 813,758
5 Claims. (Cl. 121—48)

This invention relates to apparatus for driving a clock, chart recorder, or other such mechanism, and more particularly involves a timer device which utilizes a source of substantially constant fluid pressure for producing a continuous rotational movement.

The instrumentation of many industries includes the use of timer devices for driving recorder charts and the like; and very often these devices are employed in remote or relatively inaccessible locations. In the oil and gas industry, for example, wells are oftentimes drilled in non-electrified areas, and in such instances it is customary to employ mechanically wound devices which require periodic attention. Electrical timing devices have also been used but since they require an auxiliary source of power for their operation, special power lines must be strung to the well site, or else power is supplied from motor-generator units.

In view of these conditions, it is one object of this invention to provide a timer system which is operated by a source of fluid pressure, such as would be available at any well drilling site. This system will operate continuously without the need for rewinding or other periodic attention.

A second object is to provide a timer device including a fluid motor having a reciprocated rod member, and means for translating the reciprocating movement thereof into a continuous rotational movement suitable for driving clock mechanisms or the like.

A third object of this invention is to provide fluid motors suitable for driving clocks, recorders and related mechanisms by utilizing a relatively constant source of pressure.

Another object is to provide means for translating a reciprocating movement of a fluid motor into a continuous and substantially uniform rotational movement, such as would be suitable for driving clock mechanisms.

Other more specific objects will be apparent from a study of the following description and in view of the accompanying drawings.

In the drawings, forming a part of this application, and in which like parts are designated by like reference numerals throughout the same.

FIG. 1 is an elevational view, partly in section, of a first embodiment of this invention.

FIG. 2 is a sectional view of a suitable four-way valve structure which may be utilized with this invention.

FIG. 3 is a partial side elevation of the device shown in FIG. 1.

FIG. 4 is a view taken on lines 4—4 of FIG. 1.

FIG. 5 is a front elevation of a second motion translating device which may be used with the the fluid motor of FIG. 1.

FIG. 6 is a plan view of the structure shown in FIG. 5.

FIG. 7 illustrates a modified arrangement of a fluid motor and a third motion translating device.

FIG. 8 is a sectional view of the motion translating device of FIG. 7 taken on lines 8—8.

FIG. 9 is a perspective view of the motion translating means used in the embodiment of FIGS. 7 and 8.

Figure 10:
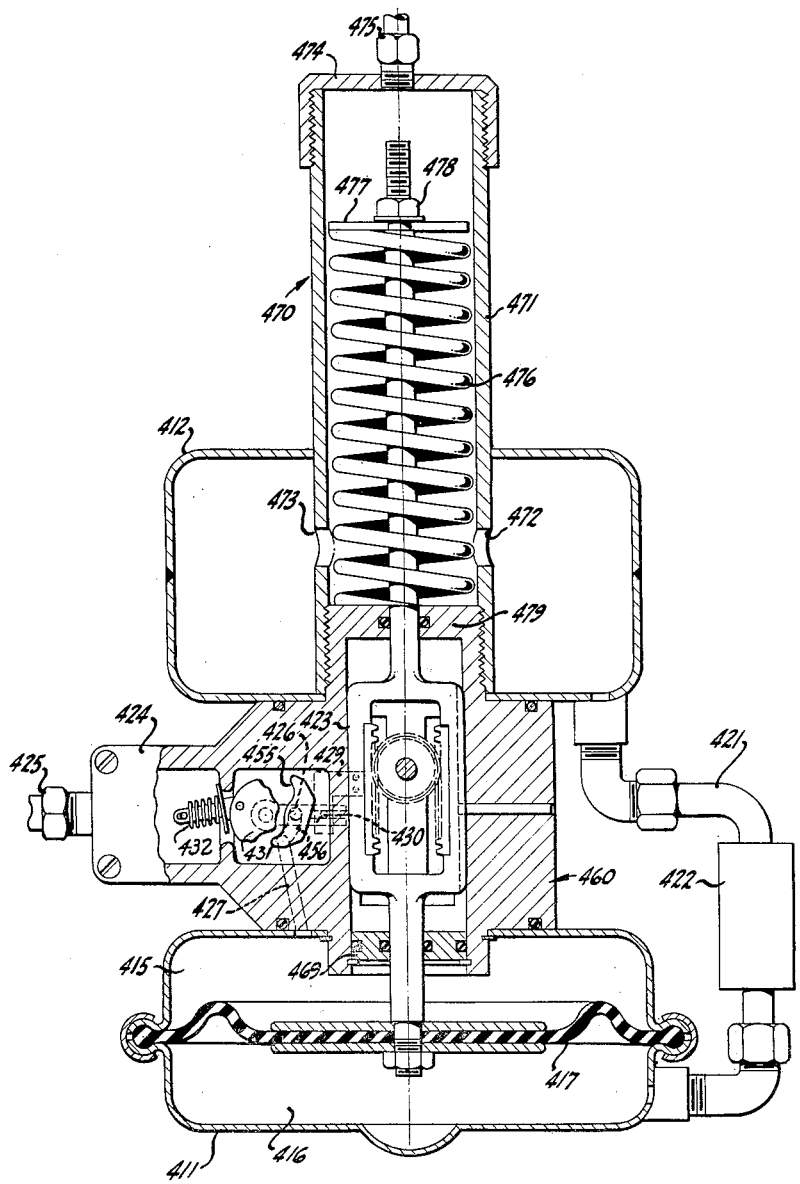
FIG. 10 is a front elevation of another embodiment of a fluid motor having a spring powered return stroke.

The timer system shown in FIG. 1 comprises essentially a source of fluid pressure taken from a pipe line 1, a fluid motor assembly 2 and motion translating means 3. The source of fluid pressure must be substantially constant to insure the uniform and continuous rotation of an output shaft 4, which may be utilized to operate a clock, chart recorder or other such mechanisms, shown as a box and indicated by reference numeral 5.

Fluid motor assembly 2 is formed with a first housing 11 and a second housing structure 12, which are essentially alike in size and connected together at a spaced distance by rods 13 and 14. Housing 11 is divided into compartments 15 and 16 by a flexible diaphragm 17; and housing 12 is similarly constructed with a flexible diaphragm 18 separating compartments 19 and 20. Adjacent compartments 16 and 19 are fluidly connected by a first conduit 21 and comprise a closed system filled with an incompressible fluid which can flow from compartment 16 to compartment 19, or in the reverse direction.

A valve means 22 is disposed in the conduit 21 to control the rate of flow between the compartments. Therefore, the rate of fluid movement will be determined by the size of opening of valve means 21 and the pressure differentials applied on diaphragms 17 and 18. If the viscosity of the incompressible fluid used in compartments 16 and 19 remained constant throughout various temperature changes, the valve could be a simple needle valve or orifice. However, most suitable fluids will change viscosity over less than extreme temperature changes and it is, therefore, desirable to employ a temperature compensating type valve, such as disclosed in Patent No. 2,966,170.

A rod member 23 connects to the flexible diaphragm 17 and projects outwardly from the housing 11 in which it is mounted for reciprocating movement. Therefore, as the diaphragm 17 is moved to and fro by the operating fluid pressure alternately introduced to compartments 15 and 20, the rod member 23 is also reciprocated.

A conventional valve assembly 24 substantially as shown in FIG. 2 is secured to the housing 11. The valve has a passageway 51 which communicates with the source of fluid pressure (such as gas) through conduit 25, and a second passageway 52 connects to an exhaust outlet 26. Passageways 53 and 54 connect with compartments 15 and 20, respectively, through an opening 27 and a conduit 28.

A rotary valve element 55 having two oppositely spaced peripheral grooves 56 and 57 therein may be rotated by a trip lever 29, shown in FIG. 1, between a first and second position. In the first position, reference being made to FIG. 2, compartment 20 is placed into fluid communication with the pressure source through conduit 28, passageway 54, groove 57, passageway 51, and conduit 25. Compartment 15 is at such time placed into fluid communication with the exhaust outlet 26 through opening 27, passageway 53, groove 56 and passageway 52. When the rod member 23 is moved upwardly from the position shown in FIG. 2, the collar member 30 will trip lever 29 and rotate valve element 55 into a second position. Groove 57 will then link passageway 53 to passageway 51, and groove 56 will link passageway 54 and passageway 52, causing a reverse connection between the working compartments 15 and 20, the fluid pressure conduit 25 and exhaust outlet 26.

FIGS. 1 and 3 illustrate one form of motion translating means for changing reciprocating movement of the rod member 23 into a substantially continuous and uniform rotary movement of a shaft. Means is provided for mounting the rack plate member 31 onto the reciprocated rod member, whereby the former is moved reciprocally with the latter, and also is moved laterally at the beginning of each stroke. Pins 32 are connected to rod member 23 and project into elliptical slots 33 which are formed in the rack plate. The ends of the pins may be flattened over the outer surface of the rack plate in such manner as to secure the rack plate to the shaft but to permit limited relative movement between rack plate and rod along the major axes of the elliptical slots. Rack plate 31 has a rack surface with first and second parellel and facing portions 34 and 35 which extend axially of the rod member. A pinion 36 is rotatably mounted equidistant of surface portions 34 and 35 when pins 32 are midway between the ends of their respective slots. The size of the pinion is such that it will mesh with one or the other surface portions depending upon slight lateral movements of the rack plate.

Referring more particularly to FIG. 3, a support structure 37 is secured to housing 11 and a journal member 38 in which shaft 39 is supported. Shaft 39 is rigidly connected to pinion 36 and is operated therewith. A spring clutch 40 connects to the journal member 38 and encloses shaft 39, permitting only a clockwise rotation of shaft 39.

As the rod member 23 begins moving upwardly with respect to the pinion 36, pins 32 are also driven upward, engaging the upper surfaces of slots 33 and camming the rack plate to the right, as shown in FIG. 1. The pins are quickly positioned in the upper ends of the slots, but during this short upward travel the teeth of rack surface portion 34 mesh with the teeth of pinion 36 and cause the pinion and shaft 39 to rotate in a clockwise direction. Before the rack plate reaches its uppermost position, collar member 30 trips the valve lever 29 and moves the valve element 55 into the above described second position. The pressure fluid is then redirected into compartment 15, causing the diaphragm 17 to flex downwardly and force fluid from compartment 16 into compartment 19, and operating fluid from compartment 20 out the exhaust outlet 26.

Since spring clutch 40 permits only a clockwise rotation of shaft 39, pinion 36 will also be restrained from turning. Accordingly, rack plate 31 will be supported upon the teeth of pinion 36 as rod member 23 begins a downward movement with the diaphragm 17. Pins 32 quickly engage the lower surfaces of slots 33, camming the rack plate laterally and putting rack surface 35 in mesh with the pinion. Since the pinion closely abuts the surface portions 34 and 35, a slight downward movement will effect a change in meshing of the pinion from one surface portion to the other. Thus, there is no slippage or lost motion of pinion 36, and shaft 39 continues to rotate in the clockwise direction.

As shown in FIG. 4, a pair of spring washer members 31a and 31b is provided on the rack plate to hold it in an engaged position until the direction of rod movement reverses. Each washer member frictionally engages rod member 23 and resiliently biases the rack plate to one lateral position or the other, depending on the most recent reversal of rod movement.

As rod 23 approaches the end of its downward stroke, collar member 30 comes into contact with valve lever 29 and rotates valve element 55 into the first position as shown by FIG. 2. Now the cycle is repeated as just explained and is continued so long as a source of power gas is applied to the fluid motor assembly; thus, the force exerted by the gas develops a reciprocating power stroke of rod 23, which in turn is translated into a substantially continuous and uniform rotary movement of a shaft to provide a constant drive for a clock, chart recorder, or other such device.

A second embodiment of this invention, shown in FIGS. 5 and 6, is comprised of a fluid motor assembly 202 and like that of the above described embodiment, and a different form of motion translating means 203. The motor assembly, including the valve means 224, is constructed and will operate in the same manner as the first described embodiment with rod member 223 being reciprocated by the motor and operating the trip lever 229. Rod 223 carries a rack plate 231 having a rack surface with first and second parallel portions 234 and 235 which extend axially of the rod 223 and are connected through lateral tie members to rod 223 by screws 232. The rack plate and rod member move together, no lateral rack plate movement being required as in the first embodiment described. Rack surface portions 234 and 235 engage pinions 236 and 236a, respectively, which are concentrically mounted on a common shaft 239 journaled on members 238 and 238a. Also, surface portions 234 and 235 are on opposite sides of shaft 239 in order that pinions 236 and 236a will rotate in the opposite direction as the rack plate is moved upwardly and downwardly. Pinion 236 drivingly connects to shaft 239 through a first spring clutch 240, and pinion 236a drivingly connects to shaft 239 through a second spring clutch 240a. The spring clutch devices operate to drive the shaft member in the same rotational direction; thus, when the respective pinion is turning oppositely, the respective connection is declutched. Accordingly, if pinion 236 is connected by its spring clutch to drive shaft 239 on the upward stroke, then pinion 236a will be connected by its spring clutch to drive shaft 239 on the downward stroke. When either pinion is turned oppositely by the reverse stroke of the rack plate, its respective spring clutch will slip. Therefore, either an upward or downward movement of the rack plate will rotate the shaft 240 in the same rotational direction. The spring clutches are so designed that no slippage can occur during a change in direction of rack plate movement.

A third embodiment of this invention, illustrated in FIGS. 7 and 8, comprises a fluid motor assembly 302 and a motion translating means 303. The operation of this embodiment is substantially the same as that of the other embodiments described. However, the novel arrangement of parts, including novelty in structural details, provides a timer device which is compactly formed and particularly suitable for commercial manufacture and assembly. Housing structures 311 and 312 are identically formed with flexible diaphragm members 317 and 318 dividing each housing into compartments 315—316, and 319—320, respectively.

The housings are disposed in spaced relation one to the other with each compartment in an axial alignment with the others. Compartments 316 and 319 are fluidly connected by a conduit 321 and comprise a closed system filled with an incompressible fluid, similarly described above, with a temperature compensating type valve means 322 disposed in the conduit to control the rate of flow between compartments. Valve assembly 324 is identical to the one previously described which directs and controls the admission of the fluid pressure source into compartments 315 and 320 via conduits 327 and 328.

A circular opening is provided in the adjacent and facing surfaces of each housing providing axial communication between compartments 315 and 320. A connector hub assembly 360 having cylindrical and axially aligned end portions 361 and 362 mate respectively with the circular opening of housings 311 and 312. Locking nuts 363 and 364 force sealing rings 365 and 366, respectively, against the inner surface of the housing structures gripping the housings between shoulder portions 367 and 368, substantially as shown in FIG. 7. The cylindrical end portion 362 is sealed, thereby providing a fluid-tight compartment, but end portion 361 is center-bored. A rod member 323 is rigidly connected to the diaphragm 317 and projects through the center-bore of member 361 while being mounted in a bearing support means 369. The support means seals the compartment 315 but permits rod member 323 to be reciprocally moved by the diaphragm. The outer end of rod member 323 terminates in a rack plate 331 having a rack surface with first and second parallel and facing portions 334 and 335 which extend axially of the rod member 323. The rack plate is mounted in the connector hub assembly for guided reciprocating movement, shown in FIG. 8.

Pinion members 336 and 336a are disposed between rack plate 331 and engage rack surface portions 334 and 335, respectively. The pinions are concentrically aligned and mounted on a common shaft 339 with spring clutch connections 340 and 340a forming a one-way rotational drive. This assemblage of parts is better illustrated in the perspective view of FIG. 9, and its operation is identical to the motion translating mechanism described above as the second embodiment.

Another embodiment of a gas powered timer is illustrated in FIG. 10. This timer is structurally similar in certain respects to that shown in FIG. 7, and has the same motion translating means. However, the instant embodiment is operated by an unidirectional fluid drive having a return stroke powered by a spring mechanism 470.

The motor mechanism includes a pair of housings 411 and 412 which are supported and held in spaced relation to one another by a connector hub assembly 460. The housing 411 defines a fluid motor assembly having two compartments 415 and 416 separated by a flexible diaphragm 417. Housing 412 serves as a reservoir for fluid which flows to and from compartment 416 through conduit 421 and a temperature controlled flow regulator 422.

Spring mechanism 470 is mounted partly within housing 412 and includes a cylindrical casing 471 having fluid ports 472 and 473 open to the interior of said housing. One end of the casing is threadedly connected to the end of the connector hub, the other end being closed by a cap plate 474 and having an air breather 475. A coiled spring 476 is disposed within the casing and confined between the end of the hub assembly and a retainer plate 477.

Rack plate 423 is provided with an operating lever at each end, one lever being reciprocally mounted in a fluid-tight bearing surface 469 and connected to diaphragm 417; the other lever is similarly mounted in bearing surface 479, projecting inwardly of casing 471 and connecting with the retainer plate 477 by means of an adjustable nut 478.

A conduit 427 connects compartment 415 to a conventional two-way valve assembly 424. In one valve position conduit 427 is connected to a source of operating pressure supplied from conduit 425; if operated to the other position (as shown), valve element 455, having a passage groove 456, connects the conduit to an exhaust port 426, thereby venting compartment 415 and allowing the coiled spring to move the rack plate upward.

The operation of this device is similar to the others, and as the rack plate 423 reciprocates to and fro, a lever 429 attached to the rack plate engages lever 430 of the valve assembly, causing an operating member 431 and snap action mechanism 432 to move valve element 455 from one position to the other. Accordingly, if compartment 415 is presently vented to an exhaust, then spring 476 will move the rack plate upward, allowing fluid to pass into compartment 416. As the rack plate arrives near the end of its traverse, lever 429 will move lever 430 until valve element 455 is tripped into its other position, connecting conduit 427 (and compartment 415) to a source of fluid pressure. The resulting pressure upon the flexible diaphragm will overcome the pressure of spring 476 and cause it to be compressed while the rack plate moves downward. Fluid in compartment 416 will then be forced into the reservoir 411, the pressure being relieved through ports 472 and 473 and breather 475. When the rack nears the opposite end of its travel, the valve element is again reversed and the cycle is repeated. The length of the time cycle provided by this device is dependent upon the pressure of the power fluid, the viscosity of the incompressible liquid, the restriction of valve 422, the load on spring 476 and atmospheric pressure; it is by adjustment and design of these variables that the cycle of operation is controlled.

It is to be understood that the forms of the invention herewith shown and described are to be taken as preferred examples of the same, and that various changes in the shape, size and arrangement of parts may be resorted to, without departing from the spirit of the invention, or the scope of the attached claims.

What we claim and desire to secure by Letters Patent is:

1. In a timer system comprising: a substantially constant source of fluid pressure, a first housing having a movable wall therein dividing said first housing into a first and second compartment, a second housing having a movable wall therein dividing said housing into a third and fourth compartment, a first conduit fluidly connecting said second and third compartments, an incompressible fluid filling said second and third compartments and said first conduit, an adjustable flow control valve means in said first conduit; a valve means operative between a first position for connecting said first compartment to said source of fluid pressure and connecting said fourth compartment to an exhaust, and a second position for connecting said first compartment to said exhaust and connecting said fourth compartment to said source of fluid; a rod member connected to one of said movable walls and mounted in said respective housing for reciprocating movement; means operated by one of said walls for manipulating said valve means between said first and second positions; and means translating said reciprocating rod movement into a continuous and uniform rotary movement of a shaft.

2. In a timer system comprising: a substantially constant source of fluid pressure, a first housing having a flexible diaphragm therein dividing said first housing into a first and second compartment, a second housing having a flexible diaphragm therein dividing said housing into a third and fourth compartment, a first conduit connecting said second and third compartments, an incompressible fluid filling said second and third compartments and said first conduit, a temperature compensating valve in said first conduit; a valve means operative between a first position for connecting said first compartment to said source of fluid pressure and connecting said fourth compartment to an exhaust, and a second position for connecting said first compartment to said exhaust and connecting said fourth compartment to said source of fluid; a rod member connected to one of said housing diaphragms and mounted in said respective housing for reciprocating movement; means operated by one of said diaphragms for manipulating said valve means between said first and second positions; and means translating said reciprocating rod movement into a continuous and uniform rotary movement of a shaft.

3. In a timer system comprising a substantially constant source of fluid pressure, a first housing having a movable wall therein dividing said first housing into a first and second compartment, a second housing defining a fluid reservoir, a conduit connecting said second compartment to said reservoir, an incompressible fluid disposed in said reservoir, an adjustable flow control valve means in said conduit; a valve means operative between a first position for connecting said first compartment to said source of fluid pressure, and a second position for connecting said first compartment to an exhaust; a spring return mechanism; a rod member mounted for reciprocating movement and interconnecting said movable wall and said spring return mechanism; means operated by movement of said movable wall for manipulating said valve means between said first and second positions; and means translating said reciprocating rod movement into a continuous and uniform rotary movement of a shaft.

4. In a timer system, apparatus comprising: means providing a substantially constant source of fluid pressure, a first housing having a first movable wall therein dividing said housing into a first and a second compartment, a second housing defining a fluid reservoir, conduit means fluidly communicating said reservoir with said first compartment, an incompressible fluid filling said first compartment and said conduit means and at least a portion of said reservoir, a temperature compensated flow control valve means in said conduit means, a valve means operative between a first position for connecting said second compartment to said source of fluid pressure and a second position for connecting said second compartment to an exhaust, means for moving fluid from said reservoir into said first chamber when said valve means is operated from said first position to said second position, and means responsive to reciprocating movement of said movable wall for translating said movement into a continuous rotary movement suitable for operating timing devices.

5. A fluid motor for a timer system, comprising: a pair of identical housings, each having a movable wall therein dividing respective housings into first and second compartments, said housings being disposed in spaced, but facing relation one to the other, with each compartment in an axial alignment with the others, a connector hub assembly having cylindrical and axially aligned end portions extending into complementary openings formed in adjacent and facing surfaces of said housings, locking nuts for securing said hub assembly to each housing, said hub assembly having an inner coaxial passageway opening into one of said housing compartments, a rod member extending through said passageway and connecting to the movable wall of said one housing, whereby said rod is adapted to be moved reciprocally in said passageway, means providing a fluid pressure seal between said rod and said passageway, a rack member mounted within said passageway for reciprocating movement and movable with said rod member, means including at least one pinion engaged with said rack member for translating reciprocating movements of said rack to continuous one-direction rotary movement, a valve means operative between a first position for connecting a source of fluid pressure to one of said second compartments and connecting the other second compartment to an exhaust, and a second position for reversing said pressure source and exhaust connections, and means operated by the reciprocating movement of said rack member for actuating said valve means between first and second positions.

References Cited in the file of this patent

UNITED STATES PATENTS

| | | |
|---|---|---|
| Re. 18,411 | Jenney | Apr. 5, 1932 |
| 590,861 | Severy | Sept. 28, 1897 |
| 706,688 | Reynders et al. | Aug. 12, 1902 |
| 712,361 | Clarke | Oct. 28, 1902 |
| 1,123,172 | Compton | Dec. 29, 1914 |
| 1,311,660 | Lynde | July 29, 1919 |
| 1,750,634 | Forsberg | Mar. 18, 1930 |
| 2,090,575 | DeMotte | Aug. 17, 1937 |
| 2,381,112 | Clarke | Aug. 7, 1945 |
| 2,601,511 | Gaffney | Aug. 17, 1948 |
| 2,749,700 | Seligman | June 12, 1956 |
| 2,808,811 | McLaughlin | Oct. 8, 1957 |